United States Patent
Mihara et al.

(10) Patent No.: US 7,054,550 B2
(45) Date of Patent: May 30, 2006

(54) RANGEFINDER APPARATUS

(75) Inventors: Yoshikazu Mihara, Saitama (JP); Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 145 days.

(21) Appl. No.: 10/897,038

(22) Filed: Jul. 23, 2004

(65) Prior Publication Data

US 2005/0129393 A1    Jun. 16, 2005

(30) Foreign Application Priority Data

Jul. 23, 2003    (JP)    ............................. 2003-278553

(51) Int. Cl.
  G03B 13/36    (2006.01)
  G01C 3/08    (2006.01)
(52) U.S. Cl. ...................... 396/104; 396/121; 396/124; 396/128; 356/3.14
(58) Field of Classification Search ................ 396/104, 396/121–125, 128; 356/3.13, 3.14, 4.04
See application file for complete search history.

(56) References Cited

U.S. PATENT DOCUMENTS

| | | | |
|---|---|---|---|
| 4,716,434 A | * | 12/1987 | Taniguchi et al. .......... 396/123 |
| 4,862,204 A | * | 8/1989 | Ishida et al. ................ 396/104 |
| 5,561,497 A | | 10/1996 | Muramatsu et al. |
| 5,659,816 A | * | 8/1997 | Uchiyama ................... 396/124 |
| 5,960,219 A | | 9/1999 | Kageyama et al. |
| 6,700,651 B1 | | 3/2004 | Taka |
| 2003/0123867 A1 | | 7/2003 | Yoshida et al. |
| 2004/0081443 A1 | | 4/2004 | Yoshida |
| 2005/0036128 A1 | * | 2/2005 | Mihara et al. ............. 356/3.14 |

\* cited by examiner

Primary Examiner—W. B. Perkey
(74) Attorney, Agent, or Firm—Leydig, Voit & Mayer, Ltd.

(57) ABSTRACT

A rangefinder apparatus includes an effective minimum value certifying unit for comparing a minimum value, exhibiting the smallest value in correlation values calculated for the each rangefinding area, with a reference value for a degree of correlation and certifying a minimum value smaller than the reference value as an effective minimum value, effective for a rangefinding calculation, a distance calculating unit for calculating the distance to the object according to the effective minimum value certified for each rangefinding area; and a correlation calculation restricting unit for omitting the correlation calculation within a specific distance range, farther by at least a predetermined amount than the shortest distance calculated according to the effective minimum value in the correlation calculation for a rangefinding area to be later subjected to the correlation calculation, when the effective minimum value exists in the rangefinding area earlier subjected to the correlation calculation.

4 Claims, 10 Drawing Sheets

RANGEFINDER APPARATUS

BACKGROUND OF THE INVENTION

1. Field of the Invention

The present invention relates to a rangefinder apparatus for use in AF (Auto Focus) cameras, video cameras, etc.

2. Related Background Art

As a rangefinding system for rangefinder apparatus used in AF (Auto Focus) cameras and video cameras, a so-called passive rangefinding scheme which makes it possible to measure distances ranging from a short distance to a long distance if an object image has a certain degree of brightness and contrast has conventionally been known in general.

In the passive rangefinding scheme, correlation is calculated according to output signals of a pair of light-detecting sensors on which a pair of object images are respectively formed by external light from an object, and the distance to the object is calculated according to the smallest minimal value (peak value) exhibiting the highest degree of correlation in the correlation values obtained by the correlation calculation. For accurately calculating the distance to the object, the correlation calculation is usually carried out for each of a plurality of rangefinding areas into which the field of view of a camera is divided.

In general, in the passive rangefinding scheme, output signals from a pair of light-detecting sensors (line sensors) are accumulated (integrated), so as to generate a pair of sensor data, which are then A/D-converted and stored for the correlation calculation. Then, while a pair of windows as areas for reading out a pair of data used for the correlation calculation from the stored pair of sensor data are relatively shifted in succession, a pair of data are sequentially read out, and the correlation calculation is carried out. According to the amount of shift of windows corresponding to the smallest minimal value (peak value) exhibiting the highest degree of correlation in the correlation values obtained by the correlation calculation, the distance to the object is calculated.

Known as a rangefinder apparatus of this kind of passive rangefinding scheme is one in which, when there is a smallest minimal value exhibiting the highest degree of correlation as a result of the correlation calculation carried out earlier in a certain rangefinding area, the window shift is limited in principle for a shift range smaller than the amount of window shift corresponding to the smallest minimal value (i.e., a range farther than the object) when carrying out the correlation calculation later in other rangefinding areas, so as to partly omit the correlation calculation, thereby shortening the total rangefinding time (see, for example, Japanese Patent Application Laid-Open No. 2002-311327).

For enhancing the reliability of the smallest minimal value exhibiting the highest degree of correlation in the correlation value obtained by the correlation calculation carried out earlier in a certain rangefinding area, smallest minimal values lower than a predetermined value (a reference value for the degree of correlation) are not employed as the smallest minimal value for partly omitting the correlation calculation when carrying out the correlation calculation later in other rangefinding areas in the rangefinder apparatus disclosed in Japanese Patent Application Laid-Open No. 2002-311327.

Meanwhile, when determining whether the smallest minimal value exhibiting the highest degree of correlation obtained by the correlation calculation carried out earlier in a certain area is reliable or not, the rangefinder apparatus disclosed in Japanese Patent Application Laid-Open No. 2002-311327 does not take account of whether the object image has a high or low contrast at all, whereby results of the determination may vary depending on whether the contrast of the object image is high or low. As a result, the range for carrying out the correlation operation later may unnecessarily be omitted in other rangefinding areas, which lowers the rangefinding accuracy.

Figure 9:
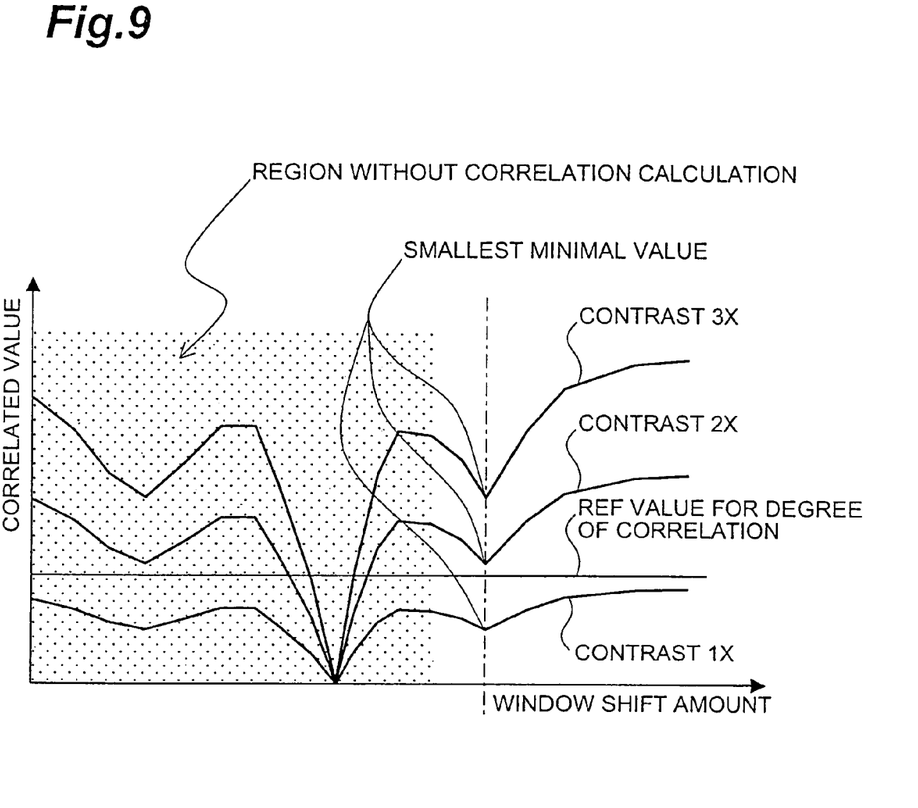
FIG. 9 is a graph showing the relationship between the correlation value of a pair of images of an object to be subjected to rangefinding and the window shift amount in connection with whether the contrast of images is high or low.

Namely, in graphs representing degrees of correlation obtained by correlation calculations, the correlation value is expanded as the contrast of the object image is higher as shown in FIG. 9. Therefore, smallest minimal values corresponding to the same window shift amount in a region where correlation is calculated may yield different results of determination. For example, when the contrast is low, a value lower than the reference value for the degree of correlation may be obtained and thus be determined as the smallest minimal value with a high reliability; whereas, when the contrast is high, a value higher than the reference value for the degree of correlation may be obtained and thus be determined as the smallest minimal value with a low reliability. As a result, the rangefinding accuracy may deteriorate.

The rangefinder apparatus disclosed in Japanese Patent Application Laid-Open No. 2002-311327 may also be problematic in that, when a true smallest minimal value with a high degree of correlation exists in a region partly omitting the correlation calculation in other rangefinding areas, the true minimal value cannot be detected, whereby the correct distance to the object cannot be measured, which is problematic in that the rangefinding accuracy deteriorates.

Figure 10:
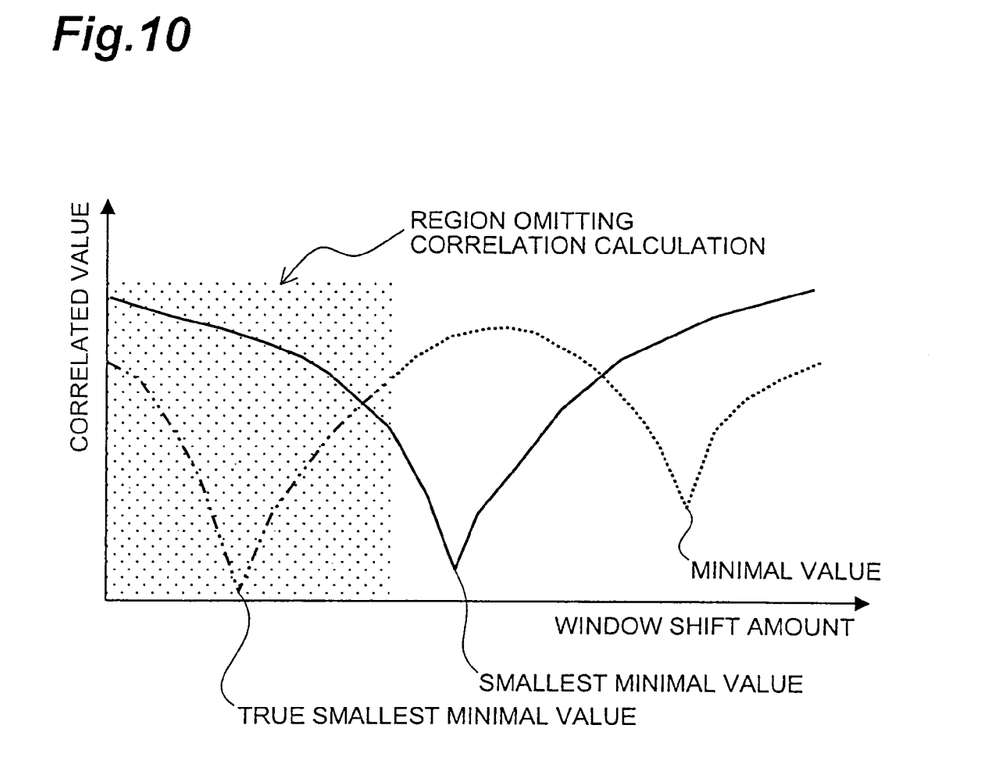

When object images formed on a pair of light-receiving sensors (line sensors) are repeated patterns and the like, in which respective minimal values exist in a region where the correlation calculation for other rangefinding areas were carried out and a region where the correlation calculation was omitted whereas the minimal value in the latter region is the true smallest minimal value as shown in FIG. 10, for example, the smallest minimal value in the latter region cannot be detected. As a result, the distance to the object cannot be measured accurately, whereby the rangefinding accuracy may deteriorate.

SUMMARY OF THE INVENTION

Therefore, it is an object of the present invention to provide a rangefinding apparatus which can shorten the rangefinding time without lowering the rangefinding accuracy.

The present invention provides a rangefinder apparatus of a passive rangefinding type for successively carrying out a correlation calculation for each rangefinding area according to respective output signals of a pair of light-receiving sensors on which a pair of images are formed by external light from an object to be subjected to rangefinding, and calculating a distance to the object according to a minimal value exhibiting the highest degree of correlation in correlation values obtained by correlation calculations of individual rangefinding areas; the rangefinder apparatus comprising effective minimal value certifying means for comparing a minimal value exhibiting the smallest value in correlation values calculated for the each rangefinding area with a reference value for a degree of correlation and certifying a minimal value smaller than the reference value as an effective minimal value effective for a rangefinding calculation; distance calculating means for calculating the distance to the object according to the effective minimal value certified for each rangefinding area; and correlation calculation restricting means for omitting the correlation calculation with in a specific distance range farther by at least a predetermined amount than the shortest distance calculated according to the effective minimal value in the correlation calculation for a rangefinding area to be later subjected to the correlation calculation when the effective minimal value exists in the rangefinding area earlier subjected to the correlation calculation; wherein the effective minimal value certifying means is configured such that the reference value for the degree of correlation is set according to a contrast of an image of the object such as to attain a high value when the contrast is high and become lower as the contrast is lower.

In the rangefinder apparatus in accordance with the present invention, the effective minimal value certifying means compares a minimal value exhibiting the smallest value in correlation values calculated for each rangefinding area with a reference value for the degree of correlation, and a minimal value smaller than the reference value is certified as an effective minimal value effective for a rangefinding calculation. At this time, the reference value for the degree of correlation is set according to the contrast of an image of the object to be subjected to rangefinding, such as to attain a high value when the contrast is high and become lower as the contrast is lower. Therefore, the result of certification for certifying the effective minimal value effective for the rangefinding calculation is kept from being affected by the contrast of the image of the object, whereby the distance to the object can appropriately be calculated regardless of whether the contrast of the image of the object is high or low.

When the effective minimal value exists in a rangefinding area earlier subjected to the correlation calculation, the correlation calculation restricting means omits the correlation calculation within a specific distance range farther by at least a predetermined amount than the shortest distance calculated according to the effective minimal value in the correlation calculation for a rangefinding area to be later subjected to the correlation calculation. Therefore, the total rangefinding time is shortened.

Preferably, the correlation calculation restricting means in the present invention is configured such that, when the effective minimal value existing in the rangefinding area earlier subjected to the correlation calculation is erroneously determined, the omission of the correlation calculation for the specific distance range according to the effective minimal value concerning the erroneous determination is released. The rangefinding apparatus comprising thus configured correlation calculation restricting means can reliably detect an effective minimal value which may exist in the specific distance range to be later subjected to the correlation calculation, and can appropriately calculate the distance to the object according to this effective minimal value.

Preferably, the correlation calculation restricting means in the present invention is configured such that, when an effective minimal value exists in a rangefinding area in which the correlation calculation is later carried out for a range excluding the specific distance range where the correlation calculation is omitted, the correlation calculation is carried out for the specific distance range where the correlation calculation is omitted in the rangefinding area. The rangefinding apparatus comprising thus configured correlation calculation restricting means can detect an effective minimal value which may exist in the specific distance range where the correlation calculation was omitted, and can appropriately calculate the distance to the object according to this effective minimal value.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 10 is a graph showing the relationship between the correlation value of a pair of images and the window shift amount in a case where the object has a repeated pattern or the like.

BEST MODES FOR CARRYING OUT THE INVENTION

Figure 1:
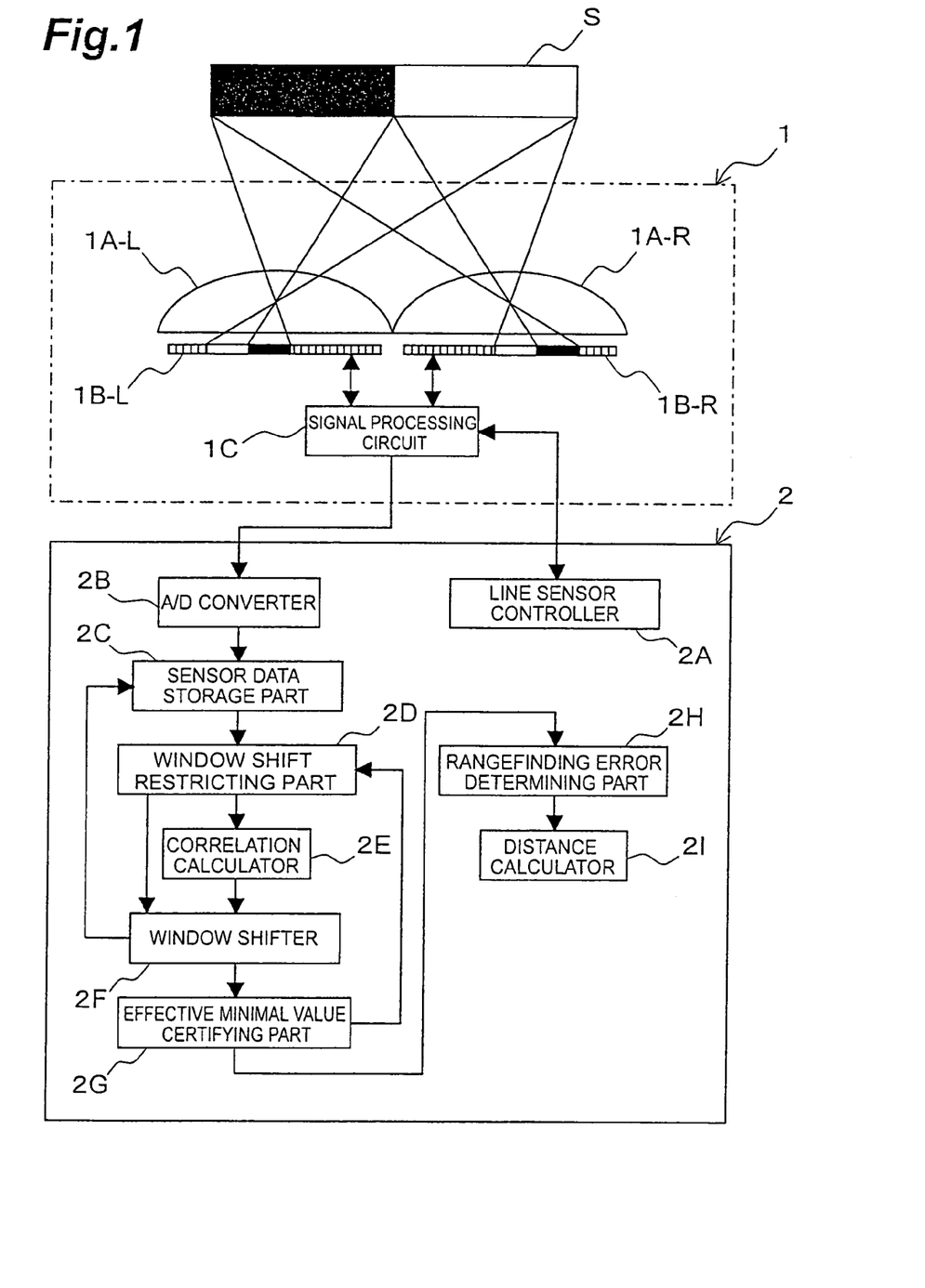
FIG. 1 is a schematic view showing the configuration of the rangefinder apparatus in accordance with an embodiment of the present invention.
Figure 2:
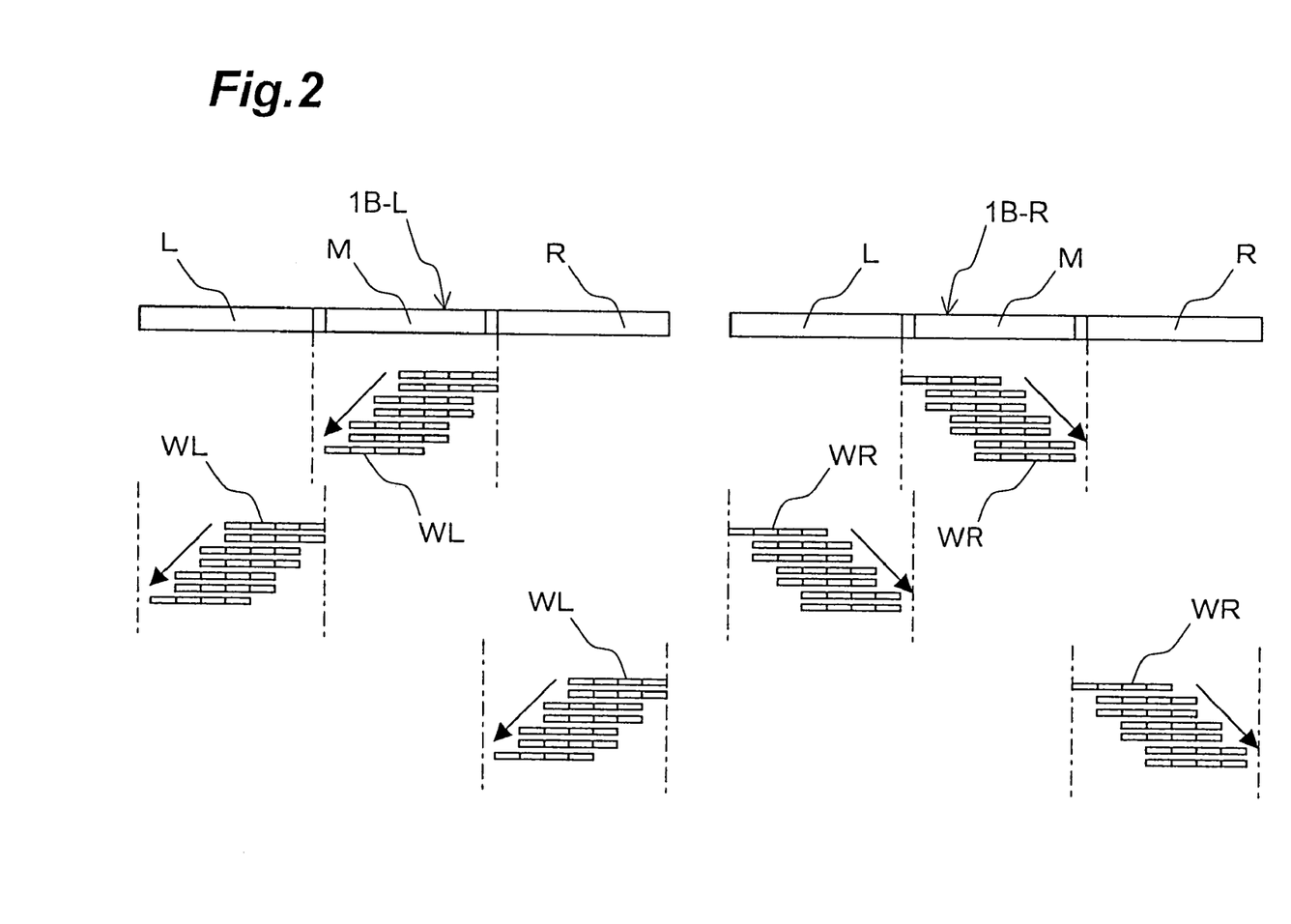
FIG. 2 is a diagram showing the relationship between the line sensors shown in FIG. 1 and window shifting operations.

In the following, embodiments of the rangefinder apparatus in accordance with the present invention will be explained with reference to the drawings. In the drawings for reference, FIG. 1 is a schematic view showing the configuration of the rangefinder apparatus in accordance with an embodiment. FIG. 2 is a diagram showing the relationship between the line sensors shown in FIG. 1 and window shifting operations.

The rangefinder apparatus in accordance with this embodiment is one used for calculating the distance from a taking lens to an object to be subjected to rangefinding in an AF (Auto Focus) camera or video camera, for example. As shown in FIG. 1, this rangefinder apparatus comprises a line sensor unit 1 including a pair of left and right rangefinding lenses 1A-L and 1A-R and a pair of left and right line sensors 1B-L and 1B-R acting as light-receiving sensors on which images of an object to be subjected to rangefinding S are formed, respectively, arranged in parallel, and a signal processing circuit 1C for processing signals from the line sensors 1B-L and 1B-R; a rangefinding arithmetic unit 2 for calculating the distance to the object S according to sensor data outputted from the signal processing circuit 1C of the line sensor unit 1; etc.

Each of the line sensors 1B-L and 1B-R is constituted by linearly arranged cells (pixels) of photodiodes divided into a large number, e.g., 234. Each cell of the line sensors 1B-L and 1B-R photoelectrically converts the quantity of light of the image of the object S formed on its light-receiving surface, thereby outputting a luminance signal of the image of the object S to the signal processing circuit 1C.

The individual cells of the line sensors 1B-L and 1B-R are provided with respective cell numbers used when taking out their output signals. For example, the cells of the left line sensor 1B-L are provided with cell numbers of L1 to L234 successively from the left side of the drawing, whereas the cells of the right line sensor 1B-R are provided with cell numbers of R1 to R234 successively from the left side of the drawing. Five cells each on the front and rear end sides of each of the left and right line sensors 1B-L and 1B-R are so-called dummy cells, so that the left line sensor 1B-L has 224 effective pixels from L6 to L229, whereas the right line sensor 1B-R has 224 effective pixels from R6 to R229.

In response to a command signal from a line sensor controller 2A of the rangefinding arithmetic unit 2 which will be explained later, the signal processing circuit 1C controls the line sensors 1B-L and 1B-R, and inputs luminance signals from the individual cells of the line sensors 1B-L and 1B-R in association with their cell numbers. The signal processing circuit 1C integrates (sums) the inputted luminance signals, thereby generating sensor data used for the correlation calculation for each cell in association with its cell number. The sensor data exhibits lower and higher values as images of the object S are brighter and darker, respectively.

The rangefinding arithmetic unit 2 is constructed by use of hardware and software of a microcomputer. The rangefinding arithmetic unit 2 comprises not only an A/D converter 2B for converting analog sensor data signals inputted from the signal processing circuit 1C by way of an I/O interface into digital signals, but also undepicted hardware devices such as a RAM (Random Access Memory) for temporarily storing thus obtained digital sensor data signals, a ROM (Read Only Memory) storing programs and data for calculating the distance to the object S, and a CPU (Central Processing Unit) which carries out various arithmetic operations for calculating the distance to the object S according to the data stored in the ROM and RAM by executing the programs stored in the ROM.

For calculating the distance to the object S according to the sensor data generated by the signal processing circuit 1C, the rangefinding arithmetic unit 2 comprises not only the line sensor controller 2A, but also a sensor data storage part 2C, a window shift restricting part 2D as correlation calculation restricting means, a correlation calculator 2E, a window shifter 2F, an effective minimal value certifying part 2G as effective minimal value certifying means, a rangefinding error determining part 2H, a distance calculator 2I as distance calculating means, etc., which are constructed as software.

The sensor data storage part 2C inputs a pair of sensor data A/D-converted by the A/D converter 2B after being generated by the signal processing circuit 1C, and stores thus inputted sensor data as sensor data associated with the numbers of individual cells of the line sensors 1B-L and 1B-R.

The window shifter 2F controls shifting operations of a pair of windows WL and WR for reading out a pair of sensor data used for the correlation calculation from the sensor data stored in the sensor data storage part 2C.

The window shifter 2F controls shifting operations of a pair of windows WL and WR such that a group of sensor data are read out from the sensor data storage part 2C for each rangefinding area unit of a center area M, a left area L, and a right area R which are sensor regions set so as to overlap each other on each of the line sensors 1B-L and 1B-R (see FIG. 2). In this case, the window shifter 2F regulates the shifting operations of the pair of windows WL and WR in the order of the center area M, left area L, and right area R, for example.

In the shifting operations in the center areas M, M of the line sensors 1B-L and 1B-R shown in FIG. 2, the window shifter 2F successively shifts, cell by cell, the window WL corresponding to the left line sensor 1B-L from the position corresponding to the initial position at the right end of the center area M to the position corresponding to the maximum shift position at the left end, and the window WR corresponding to the right line sensor 1B-R from the position corresponding to the initial position at the left end of the center area M to the position corresponding to the maximum shift position at the right end. Here, the window shifter 2F alternately shifts, cell by cell, the windows WL and WR.

Shifting operations in the left areas L, L and right areas R, R of the line sensors 1B-1 and 1B-R effected by the window shifter 2F are substantially the same as those in the center areas M, M and thus will not be explained in detail.

Each time the pair of windows WL and WR are relatively shifted cell by cell in an alternating fashion for each of the rangefinding areas M, L, and R (see FIG. 2) set on the line sensors 1B-L and 1B-R, the correlation calculator 2E reads out a group of sensor data from the sensor data storage part 2C, and executes the correlation calculation.

The correlation calculation is one in which absolute values of differences between the group of sensor data read out by one window WL and the group of sensor data read out by the other window WR are determined, and the total of the absolute values is obtained as a correlation value. As the correlation value is lower, the degree of correlation is higher, which indicates that the respective images of the object S formed on the pair of line sensors 1B-L and 1B-R are more similar to each other.

When the object S is located at a longer distance, the positional deviation between a pair of images of the object S respectively formed on the pair of line sensors 1B-L and 1B-R by way of the pair of rangefinding lenses 1A-L and 1A-R becomes smaller. As the object S is located at a shorter distance, the positional deviation between a pair of images of the object S respectively formed on the pair of line sensors 1B-L and 1B-R becomes greater. Hence, the magnitude of the positional deviation between the pair of images can be detected as the shift amount of the pair of windows WL and WR until the degree of correlation indicative of the similarity between the pair of windows is maximized, i.e., the shift amount of the pair of windows WL and WR until the correlation value obtained by the correlation calculation becomes the smallest minimal value or peak value.

Figure 3:
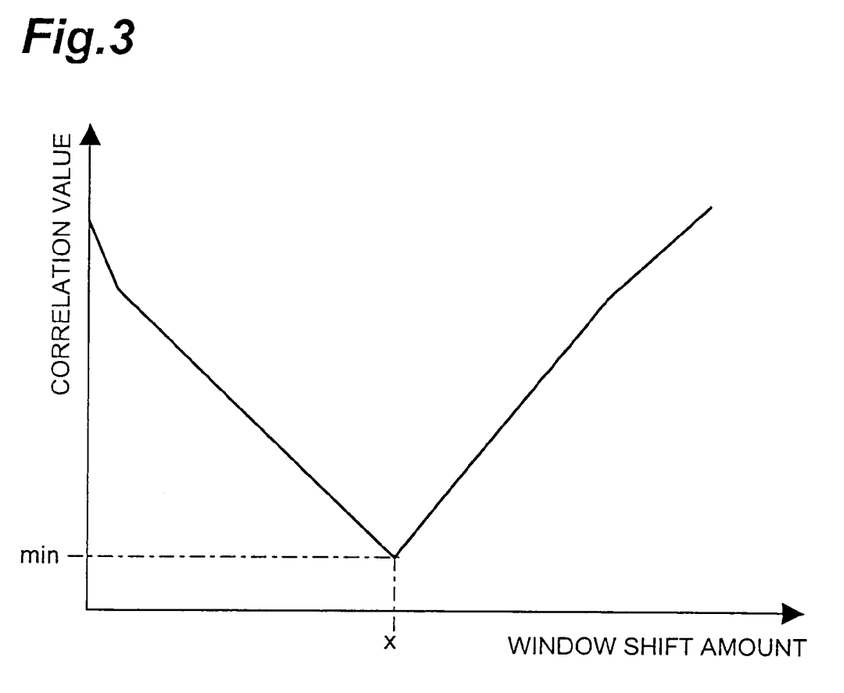
FIG. 3 is a graph showing the relationship between the correlation value of a pair of images of an object to be subjected to rangefinding and the window shift amount.

Therefore, basically as shown in the graph of FIG. 3, the distance calculator 2I shown in FIG. 1 calculates the distance to the object S according to the shift amount x of the windows WL and WR corresponding to the smallest minimal value min of the correlation value calculated by the correlation calculator 2E. According to effective minimal values certified for the individual rangefinding area units M, L, and R (see FIG. 2) of the line sensors 1B-L and 1B-R by effective minimal value certifying means which will be explained later, the distance calculator 2I calculates respective distances to the object S, and determines the distance to the object S by a predetermined averaging operation using the shortest of thus obtained distances as a reference distance.

For calculating the distance to the object S in more detail, the distance calculator 2I calculates an interpolated value according to the shift amount of windows WL and WR corresponding to the effective minimal value of the correlation value and two shift amounts respectively lower and higher than the above-mentioned shift amount. According to a shift amount corresponding to the interpolated value, the distance calculator 2I calculates the distance to the object S with reference to parameters such as the gap between the pair of rangefinding lenses 1A-L, 1A-R and the pair of line sensors 1B-L, 1B-R, the center space between the pair of line sensors 1B-L and 1B-R, and pitch intervals of individual cells in the pair of line sensors 1B-L and 1B-R.

The effective minimal value certifying part 2G shown in FIG. 1 compares the correlation value exhibiting both the smallest and minimal values among correlation values calculated in each of rangefinding area units M, L, and R (see FIG. 2) of the line sensors 1B-L and 1B-R with a predetermined reference value SL for the degree of correlation, and certifies the smallest minimal value lower than the reference value SL as the effective minimal value effective for the rangefinding calculation.

Figure 4:
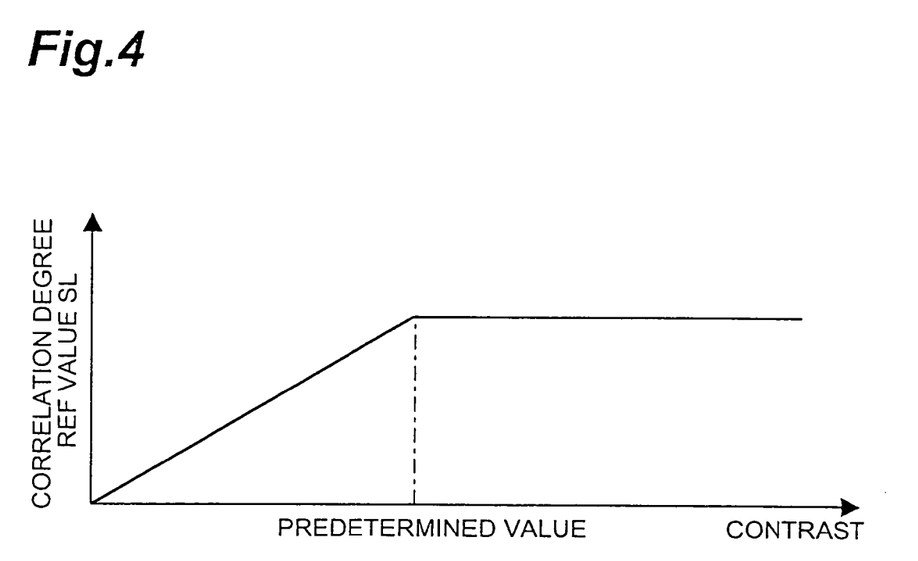
FIG. 4 is a graph showing the relationship between the reference value SL for the degree of correlation and the contrast of an image of an object to be subjected to rangefinding.

According to the sensor data within the windows WL and WR at the shift amount corresponding to the minimal value exhibiting the lowest correlation value, the effective minimal value certifying part 2G determines whether the contrast of the image of the object S is high or low in view of the difference between the largest and smallest values of the sensor data. Then, the effective minimal value certifying part 2G sets the reference value SL for the degree of correlation according to the contrast of the image of the object S such that the reference value SL attains a high value when the contrast is high and becomes lower as the contrast is lower. Namely, as shown in FIG. 4, the effective minimal value certifying part 2G increases the reference value SL for the degree of correlation in proportion to the increase in the contrast of the image of the object S until the contrast reaches a predetermined high value, and holds the reference value SL for the degree of correlation at a fixed value after the contrast exceeds the predetermined value.

Figure 5:
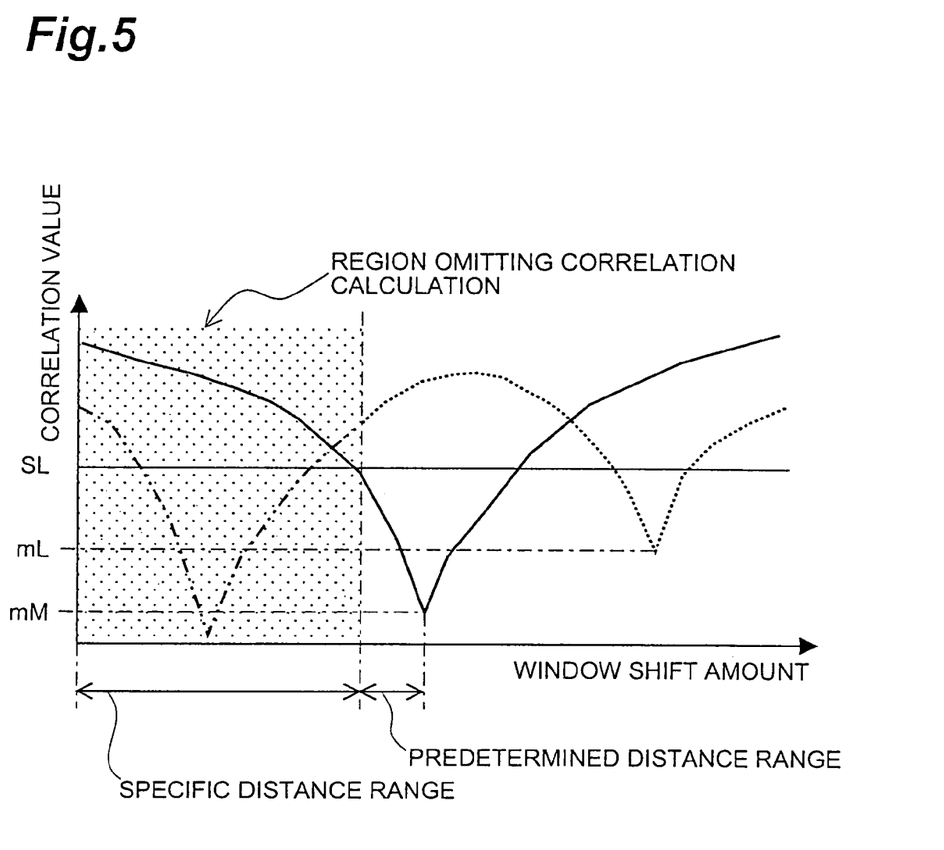
FIG. 5 is a graph showing the relationship between the correlation value of a pair of images of an object to be subjected to rangefinding and the window shift amount together with effective minimal values and a specific distance range where the correlation calculation is omitted.

In the case where an effective minimal value mM certified by the effective minimal value certifying part 2G exists in correlation values within a rangefinding area (e.g., center area M, M) earlier subjected to the correlation calculation by the correlation calculator 2E as indicated by the solid curve in the graph of FIG. 5, for example, for a shift range (dotted region FIG. 5) smaller by at least a predetermined amount than the shift amount of windows WL and WR corresponding to the effective minimal value mM, i.e., a specific distance range farther by at least a predetermined distance range than the distance calculated according to the shift amount of windows WL and WR corresponding to the effective minimal value mM, the window shift restricting part 2D (see FIG. 1) partly omits the correlation calculation by restricting the shifting operation of the windows WL and WR by the window shifter 2F when the correlation calculator 2E later carries out the correlation calculation in other areas (e.g., left area L, L). Namely, within the shift range of the windows WL and WR corresponding to the left areas L, L, the shift of windows WL and WR is restricted within a range on the initial position side farther by a predetermined amount than the object S.

The window shift restricting part 2D (see FIG. 1) is constructed such that, when the effective minimal value certified within a rangefinding area earlier subjected to the correlation calculation (e.g., effective minimal value mM certified within the center area M, M; see FIG. 5) is erroneously determined by the rangefinding error determining part 2H (see FIG. 1), the omission of the correlation calculation for the specific distance range (dotted region in FIG. 5) is released.

The erroneous determination of the effective minimal value by the rangefinding error determining part 2H (see FIG. 1) occurs when (1) the contrast of the image of the object S determined by the effective minimal value certifying part 2G in the rangefinding area earlier subjected to the correlation calculation is too low; (2) a difference exists between a pair of left and right sensor data read out by the correlation calculator 2E from the sensor data storage part 2C in the rangefinding area earlier subjected to the correlation calculation; (3) two or more minimal values with less differences therebetween exist in the correlation values calculated by the correlation calculator 2E in the rangefinding area earlier subjected to the correlation calculation; (4) differences between the minimal value exhibiting the smallest value calculated by the correlation calculator 2E in the rangefinding area earlier subjected to the correlation calculation and respective correlation values corresponding to two shift amounts lower and higher than the shift amount of windows WL and WR corresponding to the smallest minimal value are small; etc.

The window shift restricting part 2D is configured such that, when the above-mentioned effective minimal value exists in correlation values within the rangefinding area later subjected to the correlation calculation for the range excluding the specific distance range, the correlation calculation in the specific distance range is executed. When the effective minimal value mL certified by the effective minimal value certifying part 2G exists as a result of the correlation calculation in the range excluding the dotted specific distance range in the left areas L, L subjected to the correlation calculation after the center areas M, M, the correlation calculation is also executed in the dotted specific distance range shown in FIG. 5 for the left areas L, L. The same holds in the right areas R, R subjected to the correlation calculation after the left areas L, L.

When images of the objects are formed on the light-receiving surfaces of a pair of line sensors 1B-L and 1B-R by way of a pair of rangefinding lenses 1A-L and 1A-R of the line sensor unit 1, respectively, in the rangefinder apparatus in accordance with this embodiment configured as in the foregoing, the signal processing circuit 1C inputs luminance signals corresponding to the images of the object S from the pair of line sensors 1B-L and 1B-R in response to a request signal from the line sensor controller 2A of the rangefinding arithmetic unit 2, and integrates (sums) the inputted luminance signals, thereby generating a pair of sensor data for use in the correlation calculation. Then, the sensor data storage part 2C of the rangefinding arithmetic unit 2 causes the A/D converter 2B to A/D-convert the pair of sensor data generated by the signal processing circuit 1C, inputs thus converted data, and stores the sensor data as those associated with the respective numbers of cells of the line sensors 1B-L and 1B-R.

Figure 6:
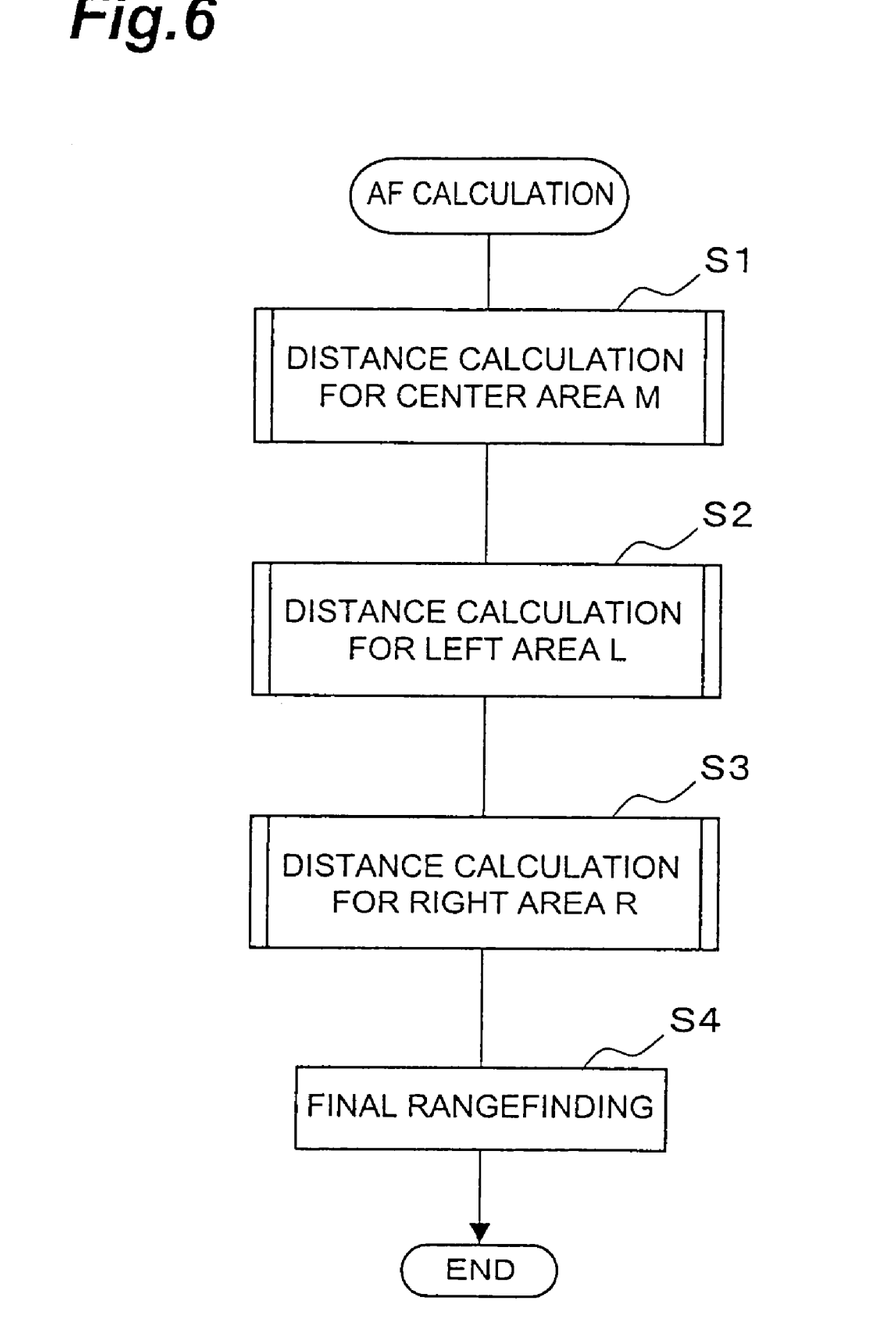
FIG. 6 is a flowchart showing the processing procedure in the rangefinder apparatus shown in FIG. 1.
Figure 7:
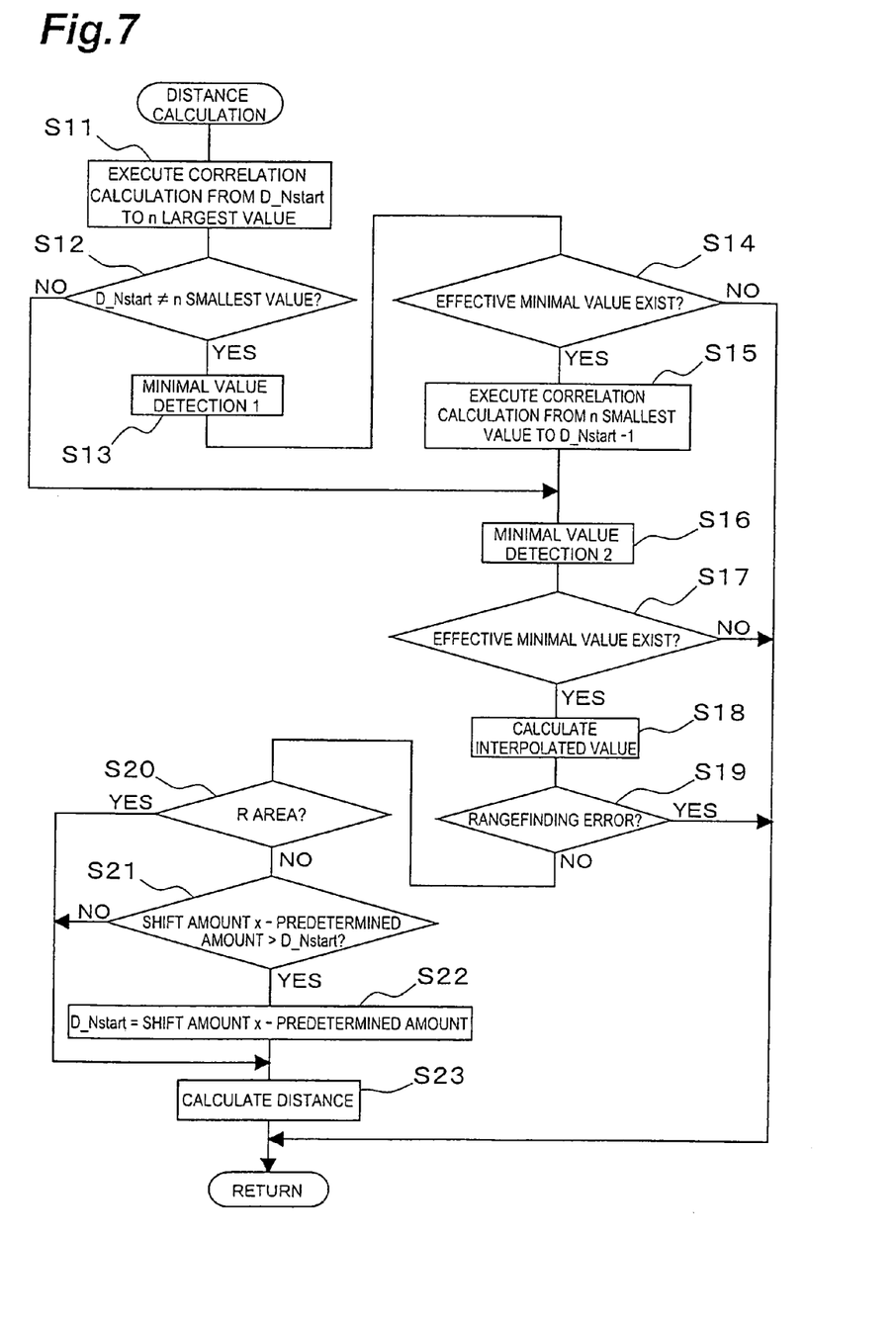
FIG. 7 is a flowchart showing the processing procedure in the subroutines for steps S1 to S3 shown in FIG. 6.
Figure 8:
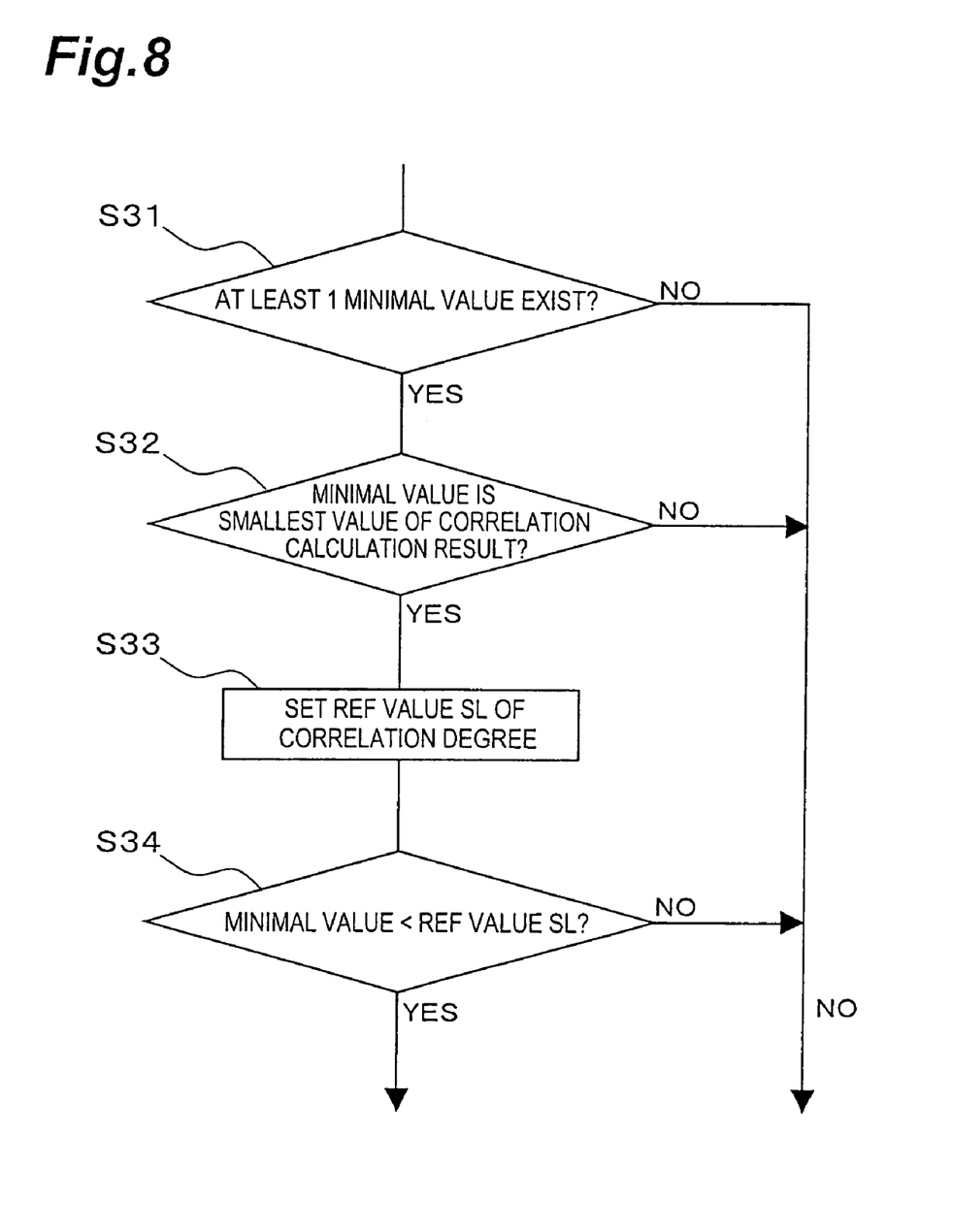
FIG. 8 is a flowchart showing a detailed processing procedure of steps S14 and S17 shown in FIG. 7.

Thereafter, the rangefinding arithmetic unit 2 calculates the distance to the object according to the processing procedure of the flowcharts shown in FIGS. 6 to 8. First, as shown in the flowchart of the main routine of FIG. 6, a distance calculating operation for center area M based on sensor data of a pair of images of the object S formed in the center areas M, M (see FIG. 2) of the line sensors 1B-L and 1B-R is carried out (S1). Subsequently, a distance calculating operation for left area L based on sensor data of a pair of images of the object S formed in the left areas L, L (see FIG. 2) of the line sensors 1B-L and 1B-R is carried out (S2). Then, a distance calculating operation for right area R based on sensor data of a pair of images of the object S formed in the right areas R, R (see FIG. 2) of the line sensors 1B-L and 1B-R is carried out (S3).

At the next step S4, a final rangefinding operation for calculating the final distance to the object S according to the respective distances in the center, left, and right areas M, L, and R calculated in steps S1 to S3 is carried out. In this final rangefinding operation, while using the shortest distance among the calculated distances in the center, left, and right areas M, R, and L as a reference value, respective differences of calculated distances in other rangefinding areas within a predetermined distance range set before hand on the side farther than the reference distance from the reference value are determined, and the average value of thus obtained distance differences is added to the reference distance, so as to yield a final rangefinding result.

In subroutines of steps S1 to S3 shown in FIG. 6, operations of steps S11 to S23 shown in the flowchart of FIG. 7 are carried out. First, at step S11 shown in FIG. 7 in the distance determining operation for center area M shown in step S1 of FIG. 6, the correlation calculation is carried out for a pair of images of the object S formed in the center areas M, M of the line sensors 1B-L and 1B-R within the range of D_Nstart to n largest value, which is a shift range of the windows WL and WR. Here, since the center area M is the initial rangefinding area, the initial value for D_Nstart becomes the n smallest value, which is the lowest shift amount, whereby the correlation calculation is carried out over the whole region of the shift range of the windows WL and WR corresponding to the center areas M, M.

At the next step S12, it is determined whether D_Nstart≠n smallest value or not. Since D_Nstart=n smallest value in the center area M here, it is determined NO, whereby the flow shifts to step S16.

At step S16, in correlation values within the range subjected to the correlation calculation at step S11, the smallest value, minimal values, the number of minimal values, and the shift amount of windows WL and WR corresponding to the minimal values are detected as minimal value detection 2. According to these detected values, it is determined at the next step S17 whether an effective minimal value effective for the rangefinding operation exists or not.

The determining operation at step S17 includes a series of processing at steps S31 to S34 shown in FIG. 8. First, it is determined at step S31 whether the number of minimal values is at least 1 or not. If the result of determination is YES, so that at least one minimal value exists, the flow proceeds to the next step S32.

At step S32, it is determined whether or not the minimal value is the smallest value in the range subjected to the correlation calculation. When the result of determination is YES, so that the minimal value is the smallest value, the flow proceeds to the next step S33.

At step S33, a reference value SL for the degree of correlation for certifying the minimal value exhibiting the smallest value as an effective minimal value effective for the rangefinding calculation is set (see FIG. 5). As shown in FIG. 4, the reference value SL increases in proportion to the increase in contrast until the contrast reaches a high predetermined value, and is held at a fixed value after the contrast exceeds the predetermined value. Namely, the reference value SL is set so as to attain a high value when the contrast of the image of the object S is high and become lower as the contrast is lower.

At step S34 subsequent to step S33, it is determined whether the minimal value exhibiting the smallest value is lower than the reference value SL for the degree of correlation or not. If the result of determination is YES, so that the minimal value exhibiting the smallest value is lower than the reference value SL for the degree of correlation, it is certified that the effective minimal value mM (see FIG. 5) exists in the center area M, whereby the result of determination at step S17 shown in FIG. 7 becomes YES, and the flow proceeds to step S18, where an interpolated value is calculated.

When each of the results of determination at steps S31, S32, and S34 shown in FIG. 8 is NO, so that there is no effective minimal value, on the other hand, the result of determination at step S17 shown in FIG. 7 becomes NO. As a consequence, a series of processing from steps S18 to S23 is omitted in order to shorten the rangefinding time, and the distance calculating operation for center area M shown at step S1 of FIG. 6 is terminated, so that the flow proceeds to the next step S2, where the distance calculating operation for left area L is carried out.

Thus, at step S33 in FIG. 6, the reference value SL for the degree of correlation is set so as to attain a high value when the contrast of the image of the object S is high and become lower as the contrast is lower, whereby the result of determination at step S17 in FIG. 7, i.e., the result of determination concerning whether the minimal value effective for the rangefinding calculation exists or not, is kept from being affected by the contrast of the image of the object S. Therefore, the rangefinder apparatus in accordance with this embodiment can appropriately measure the distance to the object S regardless of whether the contrast of the image of the object S is high or low.

In the interpolated value calculation at step S18 subsequent to step S17 in FIG. 7, an interpolated value for the shift amount is determined by using the effective minimal value mM (see FIG. 5) of the center area M certified at step S17 and two correlation values respectively corresponding to two shift amounts on both sides of the shift amount of windows WL and WR corresponding to this effective minimal value.

At the next step S19, the rangefinding error determining part 2H (see FIG. 1) determines whether there is a rangefinding error or not. If the result of determination is YES, so that there is a rangefinding error, a series of processing from steps S18 to S23 is omitted in order to shorten the rangefinding time, thus completing the processing of step S1 shown in FIG. 6, and the flow proceeds to the processing at the next step S2.

When it is thus determined at step S19 that there is a rangefinding error, the initial value for D_Nstart is not updated at step S22 which will be explained later, whereby the initial value of D_Nstart is the n smallest value that is the smallest value of the shift amount. As a result, the correlation calculation is carried out over the whole region of the shift range of windows WL and WR in the left area L later subjected to the correlation calculation, so that an effective minimal value which may exist in the left area L can reliably be detected, and the distance to the object to be subjected to rangefinding can appropriately be calculated according to this effective minimal value.

When the result of determination at step S19 is NO, so that there is no rangefinding error, the flow proceeds to the next step S20, where it is determined whether or not the rangefinding area is the right area R to be finally subjected to the correlation calculation. Since the rangefinding area is the center area M in this case, the result of determination at step S20 becomes NO, whereby the flow proceeds to the next step S21.

At step S21, it is determined whether or not the shift amount x of windows WL and WR corresponding to the effective minimal value mM (see FIG. 5) of the center area M is greater by at least a predetermined amount than the initial value of D_Nstart at step S11. When the rangefinding area is the center area M, if the shift amount x is greater by at least a predetermined amount than the n smallest value, which is the initial value of D_Nstart, the result of determination becomes YES, and the flow proceeds to the next step S22. If the result of determination is NO, the flow shifts to step S23 by skipping step S22.

At step S22, in order to partly omit the correlation calculation in the left area L where the correlation calculation is carried out after the center area M, the initial value of D_Nstart, which is the start position for the shift range of windows WL and WR, is updated to (the shift amount x−a predetermined amount) At the next step S23, the distance to the object S in the center area M is calculated according to the shift amount x determined at step S18 with reference to parameters such as the gap between the pair of rangefinding lenses 1A-L, 1A-R and the pair of line sensors 1B-L, 1B-R, the center space between the pair of line sensors 1B-L and 1B-R, pitch intervals of individual cells in the pair of line sensors 1B-L and 1B-R, and temperature conditions.

When the distance to the object S in the center area M is calculated at step S23, the distance calculating operation for the left area L shown at step S1 in FIG. 6 is completed. Subsequently, the distance calculating operation for the left area L shown at step S2 in FIG. 6 is carried out according to the flowchart of FIG. 7.

First, at step S11 shown in FIG. 7, the correlation calculation is carried out within the range of D_Nstart to n largest value, which is the shift range of windows WL and WR, for a pair of images of the object S formed on the left areas L, L of the line sensors 1B-L and 1B-R, respectively.

In any of the cases where the result of determination at step S18 in FIG. 7 is NO, the result of determination at step S19 is YES, and the result of determination at step S21 is NO in the distance calculating operation for the center area M, the initial value of D_Nstart is not updated at step S22 and thus becomes the n smallest value that is the smallest value of shift amount, whereby the correlation calculation is carried out over the whole region of the shift range of windows WL and WR corresponding to the left areas L, L at step S11. Since D_Nstart=n smallest value in this case, the result of determination at step S12 becomes NO, and the processing from steps S16 to S23 is thereafter carried out as in the center area M mentioned above.

If the initial value of D_Nstart is updated to (the shift amount x−a predetermined amount) at step S22 in FIG. 7, on the other hand, the correlation calculation is carried out within the range from (the shift amount x−a predetermined amount) to n largest amount in the shift range of windows WL and WR corresponding to the left areas L, L at step S11. Namely, the correlation calculation within the range from the n smallest value, where D_Nstart is set to (the shift amount x−a predetermined amount), to D_Nstart−1 (the correlation calculation within a specific distance range farther by at least a predetermined amount than the distance to the object S calculated in the center area M) is omitted (see FIG. 5), whereby the total rangefinding time is shortened.

Since the initial value of D_Nstart is (the shift amount x−a predetermined amount), so that D_Nstart≠n smallest value, it is determined YES at step S12, and the flow proceeds to the next step S13 and then to step S14.

At step S13, in correlation values within the range subjected to the correlation calculation at step S11, the smallest value, minimal values, the number of minimal values, and the shift amount of windows WL and WR corresponding to the minimal values are detected as minimal value detection 1. According to these detected values, it is determined at the next step S14 whether an effective minimal value effective for the rangefinding operation exists or not.

The determining operation at step S14 includes a series of processing at steps S31 to S34 shown in FIG. 8, whereby it is determined whether or not the effective minimal value mL (see FIG. 5) exists in the left area L as in step S17 mentioned above. If the result of determination at step S14 is NO, so that no effective minimal value effective for the rangefinding calculation exists in the left area L, the distance calculating operation for left area L shown at step S2 in FIG. 6 is terminated by omitting a series of processing from steps S15 to S23 in order to shorten the rangefinding time, and the flow proceeds to the next step S3, where the distance calculating operation for right area R is carried out.

In the case where the result of determination at step S14 is YES, so that the effective minimal value mL exists in the left area L, the flow proceeds to the next step S15, where the correlation calculation in the specific distance range (see FIG. 5) in which the correlation calculation was omitted at step S11 is newly carried out. Namely, the correlation calculation in the range from the n smallest value, where D_Nstart is (the shift amount x−a predetermined amount), to D_Nstart−1 is newly executed within the shift range of windows WL and WR corresponding to the left areas L, L. Therefore, an effective minimal value which may exist in the specific distance range omitting the correlation calculation can be detected, and the distance to the object Scan appropriately be calculated according to this effective minimal value.

When the correlation calculation at step S15 is completed, the flow proceeds to step S16, where the smallest value, minimal values, the number of minimal values, and the shift amount of windows WL and WR corresponding to the minimal values are detected in the range subjected to the correlation calculation at step S15. According to these detected values, it is determined at the next step S17 whether a minimal value effective for the rangefinding calculation for left area L exists or not.

Thereafter, the processing from steps S18 to S23 is carried out as in the center area M mentioned above. When the distance to the object S in the left area L is calculated, the distance calculating operation for left area L shown at step S2 of FIG. 6 is completed, and the distance calculating operation for right area R shown at step S3 in FIG. 6 is subsequently carried out according to the flowchart of FIG. 7.

First, at step S11 shown in FIG. 7, the correlation calculation is carried out within the range of D_Nstart to n largest value, which is the shift range of windows WL and WR, for a pair of images of the object S formed on the right areas R, R of the line sensors 1B-L and 1B-R, respectively.

Thereafter, the distance calculating operation for right area R is processed in substantially the same manner as that for left area L mentioned above except that the result of determination at step S20 is YES, whereby the operations at steps S21 and S22 are omitted. Namely, the distance calculating operation is carried out in light of the respective results of determination at steps S17, S19, and S21 in the distance calculating operation for center area M earlier subjected to the correlation calculation and the respective results of determination at steps S14, S17, S19, and S21 in the distance calculating operation for left area L earlier subjected to the correlation calculation.

Therefore, if an effective minimal value mM which is not erroneously determined exists in the center area M, the correlation calculation of the specific distance range based on the effective minimal value mM is omitted in the distance calculating operation for right area R. Similarly, if an effective minimal value mL which is not erroneously determined exists in the center area L, the correlation calculation of the specific distance range based on the effective minimal value mL is omitted.

In any of the cases where no effective minimal value exists in, any of the center area M and left area L and where each of the effective minimal value mM existing in the center area M and the effective minimal value mL existing in the left area L is erroneously determined, the omission of the correlation calculation of the specific distance range in the distance calculating operation for right area R is released, whereby the correlation calculation is carried out over the whole region of the shift range of windows WL and WR corresponding to the right areas R, R at step S11.

If an effective minimal value which is not erroneously determined exists in any of the center area M and left area L in the distance calculating operation for right area R, the correlation calculation in the specific distance range based on this effective minimal value is omitted.

In the rangefinder apparatus in accordance with this embodiment, as explained in the foregoing, the reference value SL for the degree of correlation used when certifying the minimal values exhibiting the smallest value in correlation values calculated for each of the rangefinding areas of the center areas M, M, left areas L, L, and right areas R, R of the line sensors 1B-L and 1B-R as the effective minimal values mM and mL (see FIG. 5) is set according to the contrast of an image of the object S such as to attain a high value when the contrast is high and become lower as the contrast is lower, whereby results of determination of effective minimal values mM and mL (see FIG. 5) effective for the rangefinding calculation is kept from being affected by the contrast of the image of the object S. Therefore, the distance to the object S can appropriately be measured regardless of whether the contrast of the image of the object S is high or low.

When the effective minimal value mM effective for the rangefinding calculation exists in the center area M which is the rangefinding area earlier subjected to the correlation calculation, the correlation calculation is omitted within a shift range smaller by at least a predetermined amount than the shift amount of windows WL and WR corresponding to the effective minimal value mM of the center area M, i.e., a specific distance range (see FIG. 5) farther by at least a predetermined amount than the distance calculated according to the effective minimal value mM, for the left area L or right area R as the rangefinding area to be later subjected to the correlation calculation. Therefore, the total rangefinding time is shortened.

Similarly, when the effective minimal value mL effective for the rangefinding calculation exists in the left area L which is the rangefinding area earlier subjected to the correlation calculation, the correlation calculation is omitted within a shift range smaller by at least a predetermined amount than the shift amount of windows WL and WR corresponding to the effective minimal value mL of the left area L, i.e., a specific distance range (see FIG. 5) farther by at least a predetermined amount than the distance calculated according to the effective minimal value mL, for the right area R as the rangefinding area to be later subjected to the correlation calculation. Therefore, the total rangefinding time is shortened.

When the effective minimal values mM and mL exist in the center area M and left area L, respectively, the correlation calculation is omitted within a shift range smaller by at least a predetermined amount than the shift amount of windows WL and WR corresponding to the effective minimal value mM of the center area M or the shift amount of windows WL and WR corresponding to the effective minimal value mL of the left area L, i.e., a specific distance range farther by at least a predetermined amount than the distance calculated according to the effective minimal value mM or mL, for the right area R.

When the effective minimal value mM existing in the center area M earlier subjected to the correlation calculation is erroneously determined, the omission of the correlation calculation in the specific distance range based on the erroneously detected effective minimal value mM is released in at least the left area L later subjected to the correlation calculation, whereby an effective minimal value which may exist in the specific distance range of the left area L can reliably be detected, and the distance to the object S can appropriately be calculated according to this effective minimal value.

When the effective minimal value mM or mL existing in the center area M or left area L earlier subjected to the correlation calculation is erroneously detected, the omission of the correlation calculation in the specific distance range based on the erroneously detected effective minimal value mM or mL is released in the right area R to be later subjected to the correlation calculation. Therefore, the distance to the object S can appropriately be calculated according to an effective minimal value which may exist in the specific distance range.

When an effective minimal value exists as a result of the correlation calculation carried out for a range excluding the specific distance range omitting the correlation calculation in the left area L or right area R to be later subjected to the correlation calculation, the correlation calculation is newly executed in the omitted specific distance range. Therefore, an effective minimal value which may exist in the omitted specific distance range can be detected, and the distance to the object, can appropriately be calculated according to this effective minimal value.

The present invention should not be limited to the above-mentioned embodiment. For example, the correlation calculation in the order of the center area M, left area L, and right area R on the line sensors 1B-L and 1B-R can be changed to that of the center area M, right area R, and left area L; that of the left area L, center area M, and right area R; and the like as appropriate.

The rangefinding areas on each of the line sensors 1B-L and 1B-R are not limited to the three areas of the center area M, left area L, and right area R, but may be five areas including a left middle area LM and a right middle area RM in addition thereto.

In the rangefinder apparatus in accordance with the present invention, the minimal value exhibiting the smallest value in correlation values calculated for each rangefinding area is compared with a reference value for the degree of correlation, and a minimal value smaller than the reference value is certified as an effective minimal value effective for the rangefinding calculation. At this time, the reference value for the degree of correlation is set according to the contrast of an image of the object subjected to rangefinding, such as to attain a high value when the contrast is high and become lower as the contrast is lower. Therefore, the rangefinder apparatus in accordance with the present invention can keep the result of certification for certifying the effective minimal value effective for the rangefinding calculation from being affected by the contrast of the image of the object to be subjected to rangefinding, and can appropriately calculate the distance to the object regardless of whether the contrast of the image of the object is high or low, thereby improving its rangefinding accuracy.

When an effective minimal value exists in a rangefinding area earlier subjected to the correlation calculation, the correlation calculation is omitted in a specific distance range farther by at least a predetermined amount than the shortest distance calculated according to the effective minimal value in the correlation calculation for a rangefinding area to be later subjected to the correlation calculation. Therefore, the total rangefinding time is shortened.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus of a passive rangefinding type for successively carrying out a correlation calculation for each of a plurality of rangefinding areas according to respective output signals of a pair of light-detecting sensors on which a pair of images are formed by external light from an object to be subjected to rangefinding, and calculating distance to the object according to a minimum value exhibiting highest degree of correlation in correlation values obtained by correlation calculations of individual rangefinding areas, the rangefinder apparatus comprising:

effective minimum value certifying means for comparing a minimum value, exhibiting the smallest value of correlation values calculated for each rangefinding area, with a reference value for degree of correlation and certifying a minimum value smaller than the reference value as an effective minimum value, effective for a rangefinding calculation;

distance calculating means for calculating the distance to the object according to the effective minimum value certified for each rangefinding area; and correlation calculation restricting means for omitting the correlation calculation within a specific distance range, farther by at least a predetermined amount than the shortest distance calculated according to the effective minimum value in the correlation calculation, for a rangefinding area to be later subjected to the correlation calculation, when the effective minimum value exists in the rangefinding area earlier subjected to the correlation calculation, wherein the effective minimum value certifying means is configured such that the reference value for the degree of correlation is set according to contrast of an image of the object and attains a high value when the contrast is high and becomes lower as the contrast becomes lower.

2. The rangefinder apparatus according to claim 1, wherein the correlation calculation restricting means is configured such that, when the effective minimum value existing in the rangefinding area earlier subjected to the correlation calculation is erroneously determined, the omission of the correlation calculation for the specific distance range according to the effective minimum value in connection with the erroneous determination is released.

3. The rangefinder apparatus according to claim 1, wherein the correlation calculation restricting means is configured such that, when the effective minimum value exists in a rangefinding area in which the correlation calculation is later carried out for a range excluding the specific distance range, the correlation calculation is carried out for the specific distance range in the rangefinding area.

4. The rangefinder apparatus according to claim 2, wherein the correlation calculation restricting means is configured such that, when the effective minimum value exists in a rangefinding area in which the correlation calculation is later carried out for a range excluding the specific distance range, the correlation calculation is carried out for the specific distance range in the rangefinding area.

* * * * *

UNITED STATES PATENT AND TRADEMARK OFFICE
CERTIFICATE OF CORRECTION

PATENT NO.        : 7,054,550 B2                                        Page 1 of 1
APPLICATION NO. : 10/897038
DATED             : May 30, 2006
INVENTOR(S)       : Mihara et al.

It is certified that error appears in the above-identified patent and that said Letters Patent is hereby corrected as shown below:

Title Page, Item
[73] Change "Fuji Photo Optical Co., Ltd." to --Fujinon Corporation--.

Signed and Sealed this

Fourteenth Day of August, 2007

JON W. DUDAS
*Director of the United States Patent and Trademark Office*